Feb. 9, 1937.   P. N. BJORK ET AL   2,069,990
GASOLINE METERING ASSEMBLY
Filed Feb. 28, 1936   2 Sheets-Sheet 1
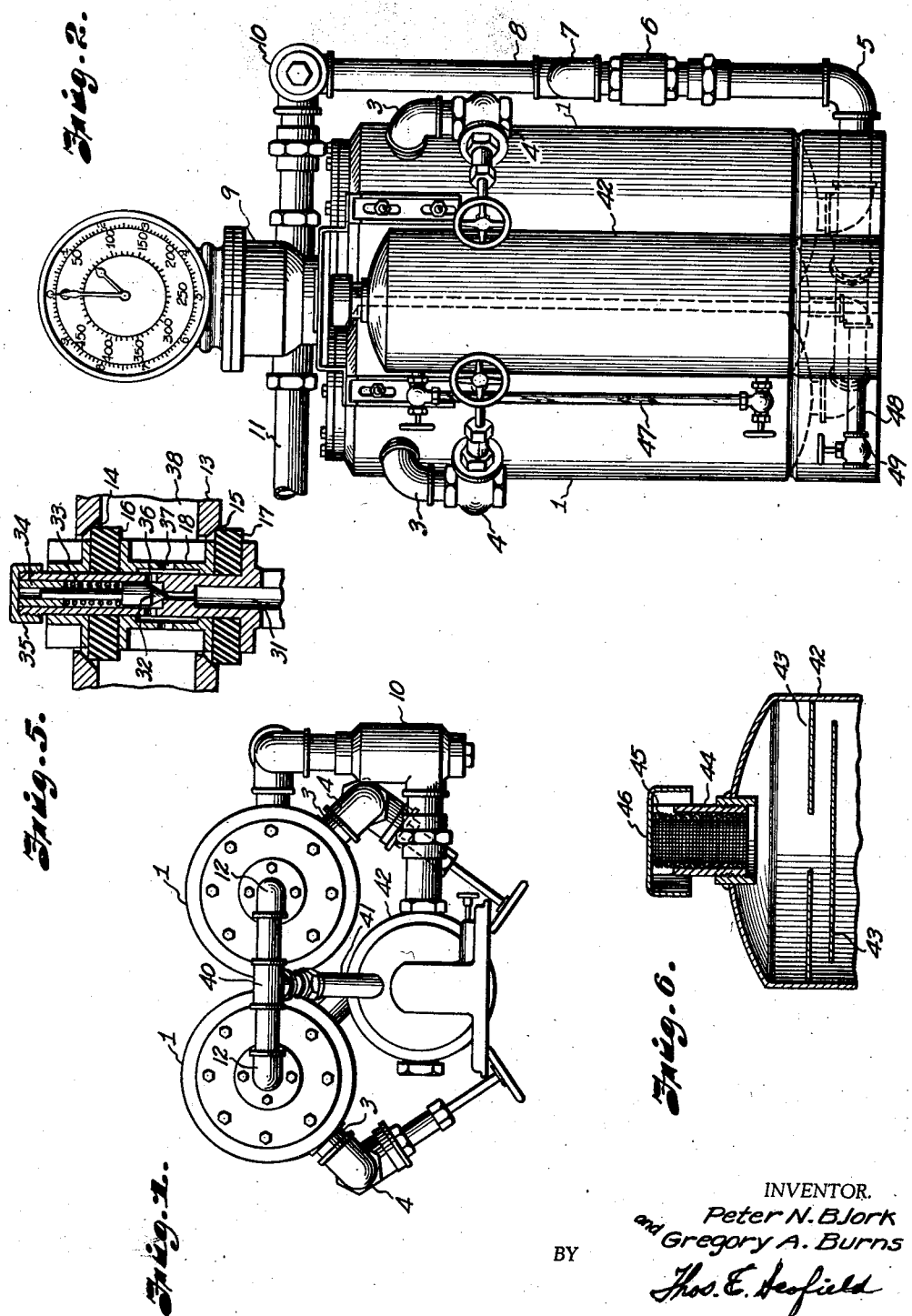
INVENTOR.
Peter N. Bjork
and Gregory A. Burns
BY
Thos. E. Scofield
ATTORNEY.

Feb. 9, 1937.  P. N. BJORK ET AL  2,069,990
GASOLINE METERING ASSEMBLY
Filed Feb. 28, 1936   2 Sheets-Sheet 2
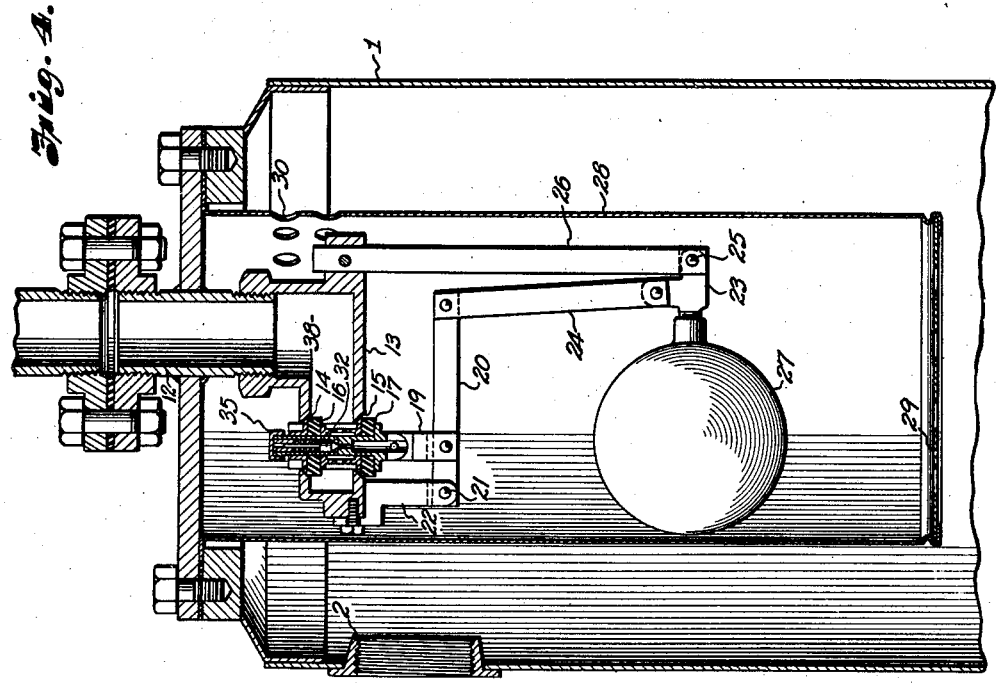
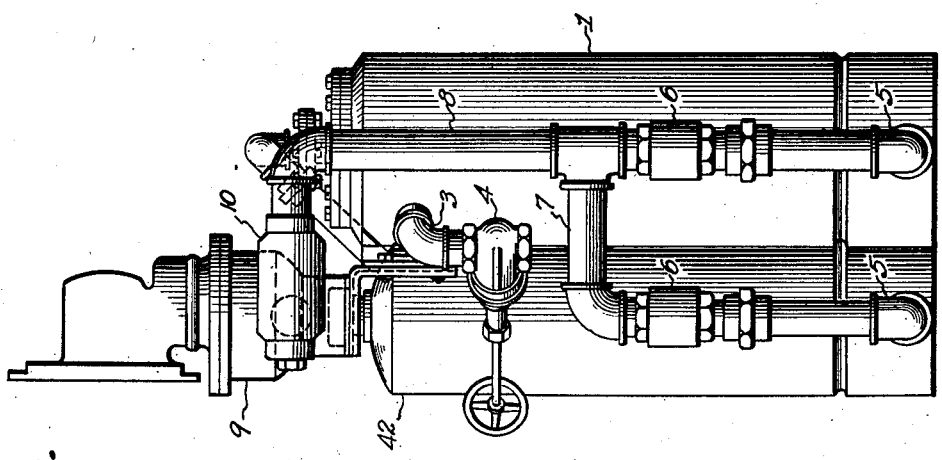
INVENTOR.
Peter N. Bjork
and Gregory A. Burns
BY
Thos. E. Scofield
ATTORNEY.

Patented Feb. 9, 1937

2,069,990

UNITED STATES PATENT OFFICE 2,069,990

GASOLINE METERING ASSEMBLY

Peter N. Bjork and Gregory A. Burns, Minneapolis, Minn., assignors to Butler Manufacturing Company, Kansas City, Mo., a corporation of Missouri Application February 28, 1936, Serial No. 66,212

4 Claims. (Cl. 73—200)

Our invention relates to a gasoline metering assembly and more particularly to an assembly in which one meter may be used to measure various grades of gasoline.

In transferring gasoline from a tank or railway tank car to bulk storage, or vice versa, the amount transferred is measured by a metering device of any suitable construction. Gasolines are made in different grades. Most gasolines contain a quantity of light ends or fixed gases such as propane, probylene, butane, and the like, which tend to vaporize or become free from solution in the heavier hydrocarbons of the gasoline on being handled. These gases or vapors, if permitted to enter the metering device, will cause either a vapor lock or an inaccuracy in the reading.

One object of our invention is to provide a handy assembly in which a single separator and meter may be employed for metering a plurality of grades of gasoline.

Another object of our invention is to provide a metering assembly in which gases or vapors are freed from the gasoline before it enters the meter.

Other and further objects of our invention will appear from the following description.

In the accompanying drawings which form part of the instant specification and are to be read in conjunction therewith and in which like reference numerals are used to indicate like parts in the various views, Figure 1 is a plan of a metering assembly showing one embodiment of our invention.

Figure 2 is an elevation of the assembly shown in Figure 1.

Figure 3 is a side elevation of the metering assembly shown in Figure 1.

Figure 4 is an enlarged sectional view of one of the receiving chambers employed in our invention.

Figure 5 is an enlarged, fragmentary, sectional view, showing a valve employed in the construction shown in Figure 4.

Figure 6 is an enlarged, fragmentary, sectional view showing the upper portion of the separator used in our assembly.

In general, our invention contemplates the provision of reception tanks into which different grades of gasoline are adapted to pass. Each reception tank is provided with an inlet opening and an outlet opening, and a vent opening controlled by a float governed valve. The vent opening communicates with the separator in which baffles are provided. The separator is vented for the escape of fixed gases, while entrained liquid is collected in the separator. The discharge openings of the reception tanks pass into a manifold which communicates with the metering device.

More particularly referring now to the drawings, I provide a plurality of reception tanks 1. Any suitable number of reception tanks may be employed, depending upon the number of different grades of gasoline it is desired to handle. The reception tanks 1 are provided with inlet openings 2 into which inlet connection pipes 3 are adapted to be secured. Each inlet pipe 3 is controlled by a suitable valve 4. At the bottoms, reception tanks 1 are connected outlet pipes 5 which communicate through suitable check valves 6 with a manifold 7. The manifold 7 is connected by a pipe 8 to a meter 9 of any suitable construction, through a strainer 10. A discharge pipe 11 conducts the gasoline which has been metered, to a manifold from which it is directed to the desired point.

Referring now to Figure 4, a vent pipe 12 is provided in each reception tank 1. A fitting 13 is secured to the inner portion of the vent pipe 12. The fitting is provided with a pair of valve seats 14 and 15 on which are adapted to seat valves 16 and 17. These valves are mounted upon a member 18 which is linked by link 19 to a lever 20. The lever is fulcrumed on pivot 21, supported by a member 22 secured to the fitting 13. Lever 20 is connected to lever 23 by a link 24. Lever 23 is fulcrumed at pivot 25, supported by arm 26. The outer end of lever 23 carries a float 27. The valve assembly and float above described are enclosed by a baffle 28. The lower end of the baffle is closed by a perforated member 29 and the upper portion of the baffle is provided with openings 30. Member 18 is provided with a bore 31 communicating with the interior of reception tank 1. The upper portion of bore 31 is normally closed by a valve 32, urged to seated position by a spring 33, the tension of which is governed by the length of bushing 34, secured by a screw threaded cap 35. The space above valve 32 is vented through openings 36 and 37 to the space 38 in the interior of fitting 13, which communicates with the vent pipe 12. The vent pipes 12 communicate with the manifold 40 which is connected by a pipe 41, which passes into the separator 42 to a point adjacent the bottom thereof. Separator 42 is provided with a plurality of baffles 43. The upper portion of separator 42 is provided with a vent pipe 44 which is provided with a suitable fire screen 45 and a protecting cap 46. A gauge glass 47 is provided for the separator 42, to show the amount of liquid contained therein. A drain pipe 48, controlled by a valve 49, is provided for draining the separator of accumulated liquid.

In operation, one of the pipes 3 is connected to gasoline to be transferred and metered. The valve 4, controlling the particular pipe is opened and gasoline is pumped through pipe 3 into the receiving tank to which the pipe is connected. Gasoline passes into the interior of the receiving tank. Entrapped air, gases and vapors will be liberated and will pass by valves 16 and 17 out of the vent pipe 12, through the manifold 40, pipe 41, into the separator 42, it being understood that the weight of float 27 will cause it to move downwardly pivoting lever 20 in a clockwise direction to open the valves. As soon as the level of the gasoline within the receiving tank reaches a point where float 27 is buoyed, it will move lever 20 counterclockwise to close valves 16 and 17. When this occurs, the introduction of further liquid through opening 2 by the pump will force liquid out through eduction pipe 5, through check valve 6, manifold 7, pipe 8, strainer 10, through meter 9, through pipe 11, and thence to its desired destination.

When valves 16 and 17 have been seated, air, gases and vapors which are entrapped above the surface of the liquid in the upper portion of receiving tank 1 will be vented when a predetermined pressure is reached through bore 31 and check valve 32. The desired vapor pressure to be maintained in the receiving tanks 1 is governed by respective bushings 34, the length of which control the tension placed upon springs 33. The vented gases and/or vapors pass into the bottom of separator 42. The entrained liquid and liquid formed by condensation of vapors will be knocked down by the baffle plates 43. The entrapped air and fixed gases will pass from the separator through the vent pipe 44. When a quantity of liquid is accumulated in the separator 42, as shown by gauge glass 47, it may be drained therefrom through pipe 48 by opening valve 49. Normally, a quantity of liquid will remain in each of the reception tanks, so that one tank is always employed for a gasoline of the same quality. If, however, it should be desired to use a reception tank for a gasoline of a different quality after it has been used for receiving gasoline of one quality, the liquid in the reception tank may be drained therefrom.

It will be seen that we have accomplished the objects of our invention. We have provided a handy metering assembly in which a single meter may be used for metering different qualities of gasolines. A single separator is employed for a plurality of receiving tanks. The assembly is such that entrapped air, gases, and vapors are freed and vented through a separator, thus avoiding vapor lock of the metering device and inaccurate readings.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a metering assembly, a plurality of receiving tanks, respective fluid inlet pipes leading into said receiving tanks, a separator, respective vent pipes communicating said receiving tanks with said separator, respective float controlled valves in said receiving tanks for controlling said vent pipes, respective relief valves bypassing said float controlled valves for relieving excess pressure, respective liquid outlet pipes for withdrawing liquid from respective receiving tanks, a manifold communicating with said outlet pipes, a metering device, means providing communication between said metering device and said manifold, and a valve in each of said outlet pipes.

2. In a metering assembly, a plurality of receiving tanks, respective fluid inlet pipes leading into said receiving tanks, a separator, respective vent pipes communicating said receiving tanks with said separator, respective relief valves in said receiving tanks for controlling said vent pipes, respective liquid outlet pipes for withdrawing liquid from respective receiving tanks, a manifold communicating with said outlet pipes, a metering device, means providing communication between said metering device and said manifold, and a valve in each of said outlet pipes.

3. In a metering assembly, a plurality of receiving tanks, respective fluid inlet pipes leading into said receiving tanks, a separator, respective vent pipes providing communication between said receiving tanks and said separator, respective float controlled valves in said receiving tanks for controlling said vent pipes, respective liquid outlet pipes for withdrawing liquid from respective receiving tanks, a manifold communicating with said outlet pipes, a metering device, means providing communication between said metering device and said manifold, and a valve in each of said outlet pipes.

4. In a metering assembly, a plurality of receiving tanks, respective fluid inlet pipes for said receiving tanks, a separating chamber, respective vent pipes for said receiving tanks providing communication between said receiving tanks and said separating chamber, respective fluid outlet pipes from said tanks, a manifold communicating with said outlet pipes, a metering device, means providing communication between said metering device and said manifold, and a valve for controlling each of said outlet pipes.

GREGORY A. BURNS.
PETER N. BJORK.